Sept. 3, 1940.  L. DEL BENE  2,213,306
WELDING ELECTRODE TONGS
Filed June 13, 1939
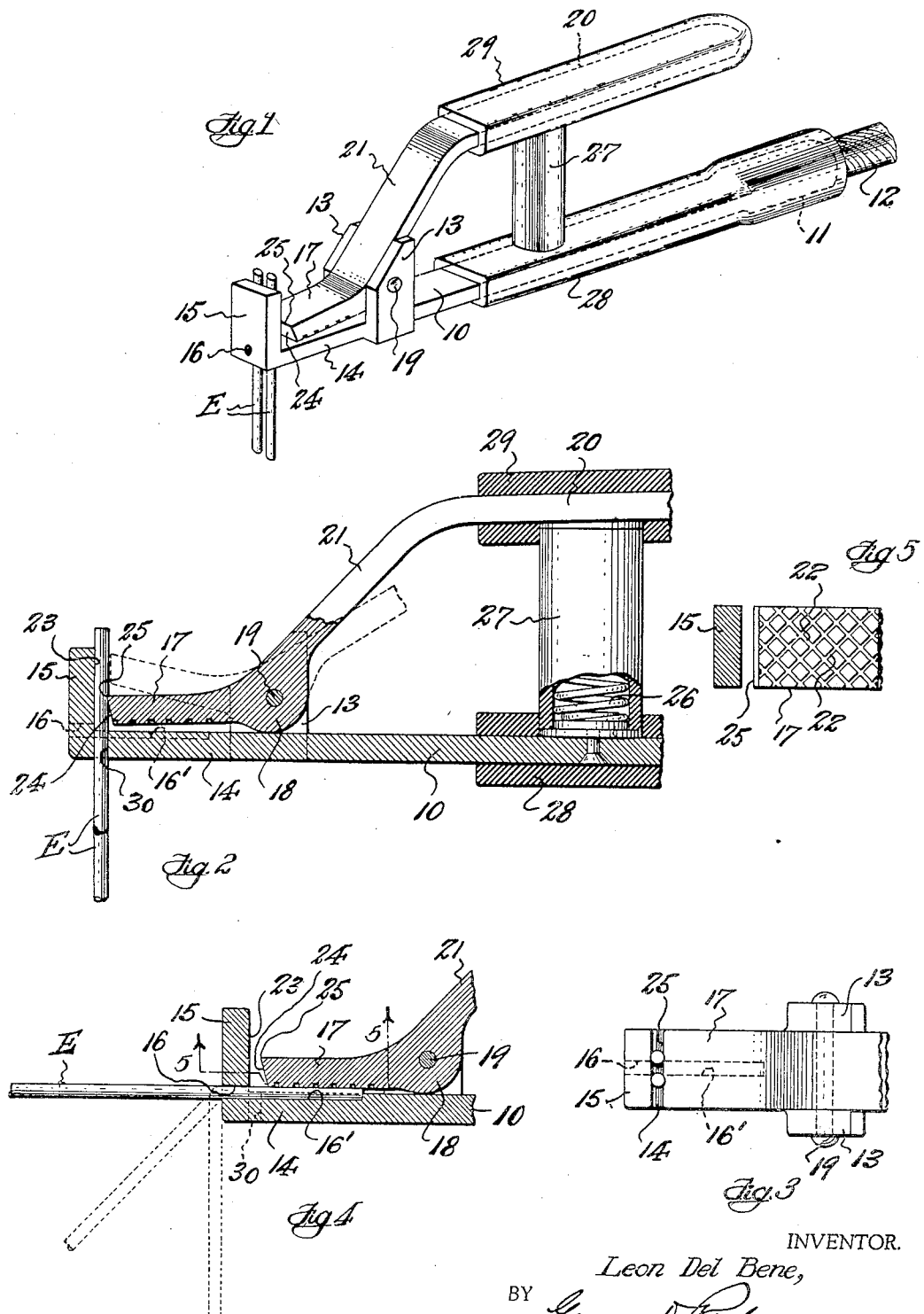
INVENTOR.
Leon Del Bene,
BY George D. Richards
ATTORNEY.

Patented Sept. 3, 1940

2,213,306

UNITED STATES PATENT OFFICE 2,213,306

WELDING ELECTRODE TONGS

Leon Del Bene, Ridgefield, N. J.

Application June 13, 1939, Serial No. 278,862

2 Claims. (Cl. 219—8)

This invention relates to improvements in means for gripping and holding electrodes used in carrying on electric welding and like operations.

The invention has for an object to provide a novel gripping tongs for holding welding electrodes subject to manipulation in welding and like operations, wherein the electrode is not only firmly and securely gripped and held against wobbling or other undesired displacement, but is also contacted for the service of electric current thereto in such manner as to avoid arcing.

The invention has for another object to provide a tongs structure having novel forms of cooperative electrode gripping jaws, whereby the electrodes may be selectively gripped in either vertical or horizontal positions, and then, if desired, bent in any desired angular deviation from said positions, while at the same time the space between the jaws is substantially protected against entrance therebetween of clogging spatters of fused metal.

Other objects of this invention, not at this time more particularly enumerated, will be understood from the following detailed description of the same.

An illustrative embodiment of the invention is shown in the accompanying drawing, in which:

Fig. 1 is a perspective view of the novel gripping tongs, showing electrodes held thereby for downward or vertical extension therefrom; Fig. 2 is a fragmentary longitudinal sectional view (somewhat enlarged) of the gripping tongs; Fig. 3 is a fragmentary top plan view of the gripping jaws of the tongs; Fig. 4 is a fragmentary sectional view, similar to that of Fig. 2, but showing an electrode held for horizontal extension from the tongs; and Fig. 5 is a fragmentary horizontal section, taken on line 5—5 in Fig. 4.

Similar characters of reference are employed in the above described views, to indicate corresponding parts.

The novel tongs structure, according to this invention, comprises an electrically conductive body member 10 having a socketed rear end portion 11 into which the end of an electrical current supply cable 12 is inserted and suitably secured. Upstanding from the sides of said body member 10, adjacent to its forward end portion, are a pair of laterally opposed perforate bearing ears or lugs 13. Said forward end portion of said body member 10 constitutes a lower stationary gripping jaw member 14, the same being provided at its outer extremity with a transverse vertical element 15 adapted to serve as a combined auxiliary jaw portion and shield. Provided in said element 15 is an opening 16 extending from back to front thereof, and in alignment with a longitudinally extending seating groove or channel 16' with which the upper face of said stationary gripping jaw member is preferably provided.

Cooperative with said stationary gripping jaw member 14 is an upper movable gripping jaw member 17, the same having a perforate fulcrum ear 18 disposed between said bearing ears or lugs 13, and pivotally connected with the latter by a pivoting cross pin 19 which extends through said bearing ears or lugs and said fulcrum ear. Extending rearwardly from said fulcrum ear 18 is a handle member 20, including an upwardly inclined offsetting portion 21 leading from said fulcrum ear. Said movable gripping jaw member 17 is provided on its under or gripping face with a suitably roughened surface, such as one provided by crossed grooves or channels 22 cut therein (see Fig. 5). The forward free end of said movable gripping jaw member 17 terminates in suitably spaced relation to the rearward face 23 of the auxiliary jaw portion and shield 15 of the stationary gripping jaw member 14. The extremity of said movable gripping jaw member 17 is provided with a downwardly and inwardly inclined or chamfered face 24, the intersection thereof with the top surface of said jaw member providing a sharp gripping edge 25 projected toward said rearward face 23 of the auxiliary jaw portion and shield 15, so as to be spaced therefrom, when said jaw member is closed, a distance somewhat less than the diameter of an electrode desired to be engaged and held by the tongs in vertical position or extension therefrom.

The jaw members of the tongs are urged to closed or electrode gripping relation by a compression spring means 26 suitably mounted to extend between the body member 10 and handle member 20. Preferably this spring means is enclosed and protected by a resilient or flexible tubular sleeve 27; said sleeve being preferably composed of soft vulcanized rubber, which not only yields to the operative movements of said spring means, but also serves as an electrical insulator protective to the user of the tongs.

The hand engageable portion of the body member 10 is suitably covered by an enclosing covering 28 of electrical insulating material, such e. g. as rubber; and, in the like manner, the handle member 20 is likewise covered by a similar covering 29 of electrical insulating material, such e. g. as rubber.

The stationary gripping jaw member 14 is provided with one or more perpendicular through openings 30, disposed tangent to the rearward face 23 of the auxiliary jaw portion and shield 15.

When it is desired to hold an electrode E engaged by the tongs for downward vertical extension therefrom, an end portion of the electrode is inserted upwardly through an opening 30 so as to laterally abut the inner face 23 of the auxiliary jaw portion and shield 15. To permit such inserted disposition of the electrode, the movable jaw member 17, by depression of the handle member 20, is first swung upward to the dotted position shown in Fig. 2, thus swinging the inclined or chamfered end face 24 of said movable jaw member to a position approximately parallel to the inner face 23 of the auxiliary jaw portion and shield 15, while at the same time moving away from the latter the sharp gripping edge 25, so that clearance is provided for the passage of the upwardly inserted electrode. After the electrode is thus inserted and disposed against said face 23 of the auxiliary jaw member and shield 15, the operator relaxes his depressing grip upon the handle member 20, whereupon the spring means 26 urges the latter upwardly so as to swing down the movable jaw member 17 to electrode engaging position, shown by full lines in Fig. 2. As the movable jaw member is thus closed, the sharp gripping edge 25 of its extremity is forced into engagement with the electrode, so as to both firmly press the same against the inner face 23 of the auxiliary jaw and shield 15, while at the same time causing said sharp gripping edge 25 to bite into the exposed side of said electrode, whereby the latter is gripped and held firmly against axial displacement. It will be obvious, that when thus engaged the electrode is ready for application to the work in hand, and is firmly held subject to all necessary manipulation by the operator in carrying on the work. If desired, by provision of a plurality of openings 30, suitably spaced, more than one electrode may be mounted in and held by the tongs subject to use. The above described use of the tongs is especially well adapted for holding an electrode or electrodes for operative application to work situated beneath the operator.

There are many cases, however, where the work is disposed in front of or above the operator, and therefore alternative means are provided for engaging an electrode E by the tongs so as to dispose the same more conveniently for application to work so situated, i. e. so that the electrode may extend horizontally or angularly from the end of the tongs. To attain such disposition of an electrode, an end portion thereof is inserted inwardly through the opening 16 in the auxiliary jaw member and shield 15, and so as to seat itself in the aligned seating groove or channel 16' provided in the upper face of the stationary jaw member 14. To permit such insertion, the movable jaw member 17 is first swung up to permit inward movement of the electrode end portion to the described inserted position, whereafter the spring means 26 is allowed to function in swinging down the movable jaw member into gripping relation to the inserted electrode end portion, as shown in Fig. 4. The roughened surface 22 of the operative face of the movable jaw member assures a strong frictional grip upon the electrode which efficiently and firmly holds the same against shifting displacement. The operative free end portion of the electrode E, when thus engaged by the tongs, will extend directly outward from the outer face of the auxiliary jaw member and shield, so that the operator may conveniently direct the same for application to the work in hand. If desired, the electrode, as thus engaged and gripped by the tongs, may be bent to any desired angle divergent to horizontal extension, as would be convenient. This is indicated by the dotted representations of the electrode shown in Fig. 4. The grip of the electrode end by the tongs is so secure, that such bending and bent or angular disposition in no way relaxes the grip of the tongs, and consequently the electrode is as efficiently and immovably held in such angular dispositions as it is in the straight horizontally extending position.

The part 15, in addition to its auxiliary jaw functions, also serves as a shield to fend off spatterings of melted metal occurring during the welding or like operation, and consequently guards the interior faces of the jaw members against undesired accumulations from such source.

From the above description, it will be obvious that the invention provides a very handy and efficient electrode gripping tongs. I am aware that many changes could be made in the tongs without departing from the scope of this invention as defined in the following claims. It is therefore intended that all matter contained in the above description or shown in the accompanying drawing shall be interpreted as illustrative and not in a limiting sense.

I claim:

1. A welding electrode tongs comprising, a main body including a stationary jaw member having an upstanding auxiliary jaw member and shield at its free extremity, said stationary jaw member having a perpendicular opening aligned with the inner face of said auxiliary jaw member and shield, and a movable jaw member mounted in connection with said main body, said movable jaw member having an undercut chamfered extremity providing a sharp gripping edge opposed to and cooperative with the inner face of said auxiliary jaw member and shield to grip an electrode upwardly inserted through said stationary jaw member.

2. A welding electrode tongs comprising, a main body including a stationary jaw member having an upstanding auxiliary jaw member and shield at its free extremity, said stationary jaw member having therethrough a perpendicular electrode passage aligned with the inner face of said auxiliary jaw member and shield, said auxiliary jaw member and shield having therethrough a horizontal electrode passage aligned with the gripping face portion of said stationary jaw member, and a movable jaw member having a gripping face opposed to the gripping face of said stationary jaw member to grip an electrode inwardly inserted through said auxiliary jaw member and shield, said movable jaw member having an undercut chamfered extremity providing a sharp gripping edge opposed to and cooperative with the inner face of said auxiliary jaw member and shield to grip an electrode upwardly inserted through said stationary jaw member.

LEON DEL BENE.